(12) United States Patent
Downing

(10) Patent No.: US 7,264,478 B1
(45) Date of Patent: Sep. 4, 2007

(54) RETRACTABLE WIRING HARNESS REEL

(76) Inventor: John D. Downing, 6310 NW. 30th St., Bethany, OK (US) 73008

( * ) Notice: Subject to any disclaimer, the term of this patent is extended or adjusted under 35 U.S.C. 154(b) by 0 days.

(21) Appl. No.: 11/529,927

(22) Filed: Sep. 30, 2006

(51) Int. Cl.
*H01R 39/00* (2006.01)

(52) U.S. Cl. .............................. 439/4; 439/501; 439/35; 191/12.4

(58) Field of Classification Search .................... 439/4, 439/501, 35, 13, 18, 20, 22, 23, 24–29; 191/12.4, 191/12.2 R
See application file for complete search history.

(56) References Cited

U.S. PATENT DOCUMENTS

| | | | | |
|---|---|---|---|---|
| 2,013,733 | A * | 9/1935 | Murphy | 191/12.4 |
| 2,466,128 | A * | 4/1949 | Striegel | 191/12.4 |
| 3,061,234 | A | 10/1962 | Morey | |
| 3,337,695 | A * | 8/1967 | Brown | 191/12.4 |
| 3,374,319 | A * | 3/1968 | Stahmer | 191/12.4 |
| 3,412,951 | A | 11/1968 | Ober | |
| 3,432,623 | A * | 3/1969 | Olzak et al. | 191/12.2 R |
| 3,450,369 | A * | 6/1969 | Olzak et al. | 242/385.1 |
| 3,489,866 | A * | 1/1970 | Tamarin | 191/12.2 R |
| 3,542,172 | A * | 11/1970 | Meletti | 191/12.2 R |
| 3,619,518 | A * | 11/1971 | Blanch et al. | 191/12.2 R |
| 3,657,491 | A | 4/1972 | Ryder | |
| 3,715,526 | A * | 2/1973 | Blanch et al. | 191/12.2 R |
| 3,887,254 | A * | 6/1975 | Landis et al. | 439/4 |
| 3,929,210 | A * | 12/1975 | Cutler et al. | 191/12.2 R |
| 4,006,852 | A * | 2/1977 | Pilsner et al. | 224/509 |
| 4,114,736 | A * | 9/1978 | Scherenberg | 191/12.4 |
| 4,138,177 | A * | 2/1979 | VAN Valer | 439/4 |
| 4,141,438 | A * | 2/1979 | Diem | 191/12.4 |
| 4,284,180 | A * | 8/1981 | Masters | 191/12.2 R |
| 4,842,108 | A * | 6/1989 | Anderson et al. | 191/12.2 A |
| 4,874,138 | A | 10/1989 | Kettenring | |
| 4,904,205 | A * | 2/1990 | Rice | 439/504 |
| 5,101,082 | A * | 3/1992 | Simmons et al. | 191/12.2 R |
| 5,129,828 | A * | 7/1992 | Bass | 439/35 |
| 5,180,040 | A * | 1/1993 | Ji | 191/12.2 R |
| 5,299,670 | A * | 4/1994 | Willard | 191/12.2 R |
| 5,518,417 | A * | 5/1996 | Liu | 439/501 |
| 5,669,471 | A * | 9/1997 | Unze | 191/12.2 R |
| 5,700,150 | A * | 12/1997 | Morin | 439/4 |
| 5,723,815 | A * | 3/1998 | Pena | 174/53 |
| 5,733,141 | A * | 3/1998 | Penrod | 439/501 |
| 5,855,262 | A * | 1/1999 | Jackson | 191/12.4 |
| 6,036,499 | A * | 3/2000 | Ford | 439/4 |
| 6,059,080 | A * | 5/2000 | Lopez, Sr. | 191/12 R |
| 6,102,173 | A * | 8/2000 | Tuttlebee | 191/12 R |
| 6,230,860 | B1 * | 5/2001 | Wu | 191/12.2 R |
| 6,273,225 | B1 * | 8/2001 | Park | 191/12.2 R |
| 6,276,502 | B1 * | 8/2001 | Leyba et al. | 191/12.2 R |
| 6,276,503 | B1 * | 8/2001 | Laughlin, Jr. | 191/12.2 R |
| 6,328,243 | B1 | 12/2001 | Yamamoto | |
| 6,349,808 | B1 * | 2/2002 | Bryant | 191/12.2 R |
| 6,648,677 | B1 * | 11/2003 | Boyd | 439/501 |
| 6,908,060 | B2 | 6/2005 | Hibbs | |
| 7,000,746 | B2 | 2/2006 | Mackin | |

* cited by examiner

*Primary Examiner*—Ross Gushi
(74) *Attorney, Agent, or Firm*—Randal D. Homburg

(57) ABSTRACT

A retractable wiring harness device attaches to the trailer frame near the trailer hitch and contains a length of retractable wiring harness which extends from a housing member to install within the wiring connection on a towing vehicle, the trailer wiring harness wired into the lighting and braking wiring harness of the trailer. When the trailer is disconnected from the towing vehicle and the retractable wiring harness is disconnected from the wiring connection of the vehicle, the wire cable is withdrawn into the housing member to retain the retractable wiring harness, keeping it off the ground and out of the way of the trailer hitch.

5 Claims, 5 Drawing Sheets

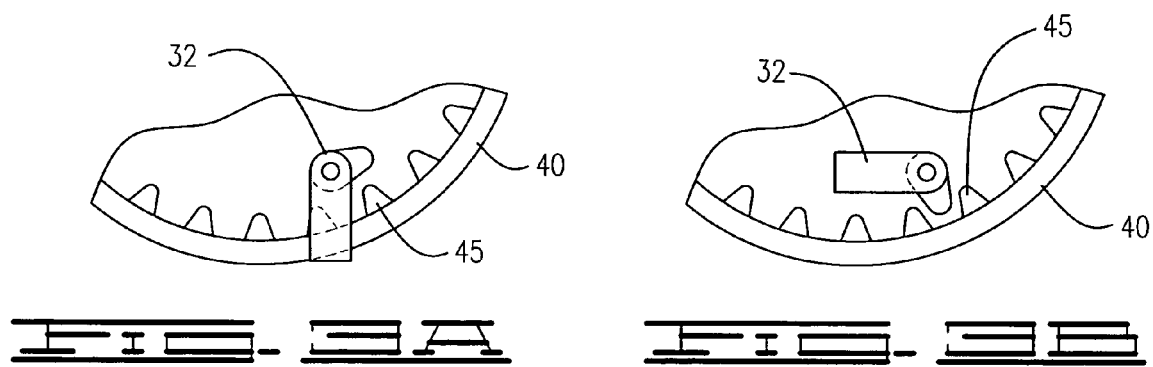
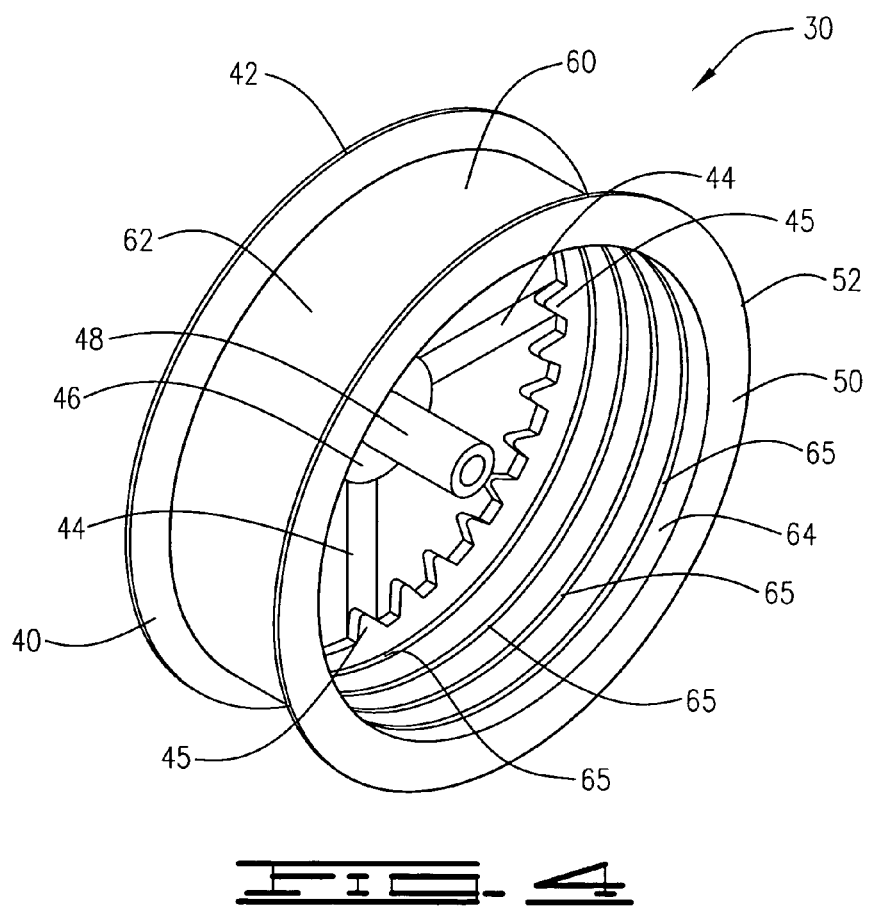

RETRACTABLE WIRING HARNESS REEL

CROSS REFERENCE TO RELATED APPLICATIONS

None

I. BACKGROUND OF THE INVENTION

1. Field of Invention

A retractable wiring harness device attaches to the trailer frame near the trailer hitch and contains a length of retractable wiring harness which extends from a housing member to install within the wiring connection on a towing vehicle, the trailer wiring harness wired into the lighting and braking wiring harness of the trailer. When the trailer is disconnected from the towing vehicle and the retractable wiring harness is disconnected from the wiring connection of the vehicle, the wire cable is withdrawn into the housing member to retain the retractable wiring harness, keeping it off the ground and out of the way of the trailer hitch.

2. Description of Prior Art

The following United States patents were discovered and are disclosed within this application for utility patent. All relate to wire and cord reel devices. In U.S. Pat. No. 6,908,060 TO Hibbs, an extension cord reel is disclosed having a single sided mounting reel upon which a cord is wound with an outer retaining ring attached to the reel. The reel in mounted on a frame and is held in place by a single pin axle. The winding of the cord in performed by manual means.

U.S. Pat. Nos. 3,657,491 to Ryder and 3,432,623 to Blanch disclose cord reels with a ratchet and pawl mechanism to retain the reel in place while the wound cord is deployed. Ryder also discloses a constant connection between the fixed end of the cord and the reel mechanism. A coil spring is disclosed in the retractable reel of U.S. Pat. No. 3,061,234 to Morey, which also includes an electrical cord with a fixed end and an extendable free end of the electrical cord.

A rotary transmission device which allows for the transmission of current between two rotary plates is disclosed in U.S. Pat. No. 4,874,138 to Kettenring, which appears to demonstrate four conductor wires mounted to a first rotary plate, with a second rotary plate having some means of contact with the first rotary plate for the transmission of current between the two rotary plates to provide current to a four wire harness. Another reel device is disclosed in U.S. Pat. No. 6,328,243 to Yamamoto which discloses a retractable reel within a housing with a wire harness wound upon a central reel with one end of the harness attached to a fixed support arm and the other end of the wiring harness being free to extend from the housing to a desired length from the housing, providing the wiring harness at extendable lengths from the housing.

II. SUMMARY OF THE INVENTION

Several trailers towed behind vehicles are often provided with taillights, brake lights, running lights, signal lights and sometimes powered brakes. The electrical wiring to these lights and brakes is provided by a wiring harness having a free end extending from the tongue or front of the trailer to multiple fixed ends at the various electrical lights and brakes. At the tongue, the free portion of the wiring harness generally terminates into an electrical connector adapted to connect to a wiring socket on the towing vehicle. These wiring harnesses and electrical connectors are designed for four, six wire bundles and connectors, some provided with even more depending on the electrical needs of the trailer.

To accommodate the different angles of attachment, movement of the trailer during tow and the different locations of the wiring socket on the different towing vehicles, the free end of the wiring harness is loosely attached to the trailer tongue. Excess length of the wiring harness is either wound around the trailer tongue or simply left to dangle freely. This wiring harness is commonly ripped from the trailer when the harness gets caught on something, becomes worn or decayed by weather when the trailer when exposed to inclement elements, is often pulled loose when inadvertently left attached to a trailer being detached from the towing vehicle and pulled loose when disconnecting a trailer, or cut when accidentally caught in the hitch during hook-up. Wiring can also be stretched resulting in an electrical short which can damage not only the wiring harness but the electrical system of the towing vehicle.

In order to protect the trailer wiring harness, a retractable reel device mounted to the front of a trailer to protect the free portion of the wiring harness is provided to protect and keep the free portion of the wiring harness during connected use and when not in use. The primary objective of the retractable reel wiring harness device is to provide a retractable reel device to keep the free end of a trailer wiring harness protected during use with the wiring harness contained in a housing, the free end being deployed from the housing for connection to a towed vehicle and retracted within the housing when disconnected. A second objective of the harness device is to protect the wiring harness from the elements and from damage during the hook-up and disconnection.

III. DESCRIPTION OF THE DRAWINGS

The following drawings are submitted with this utility patent application.

FIG. 3A is an isolated view of the reel and the reel lock mechanism in an unlocked position.

FIG. 3B is an isolated view of the reel and the reel lock mechanism in a locked position.

FIG. 4 is a perspective view of the reel from the second side of the reel.

IV. DESCRIPTION OF THE PREFERRED EMBODIMENT

Figure 1:
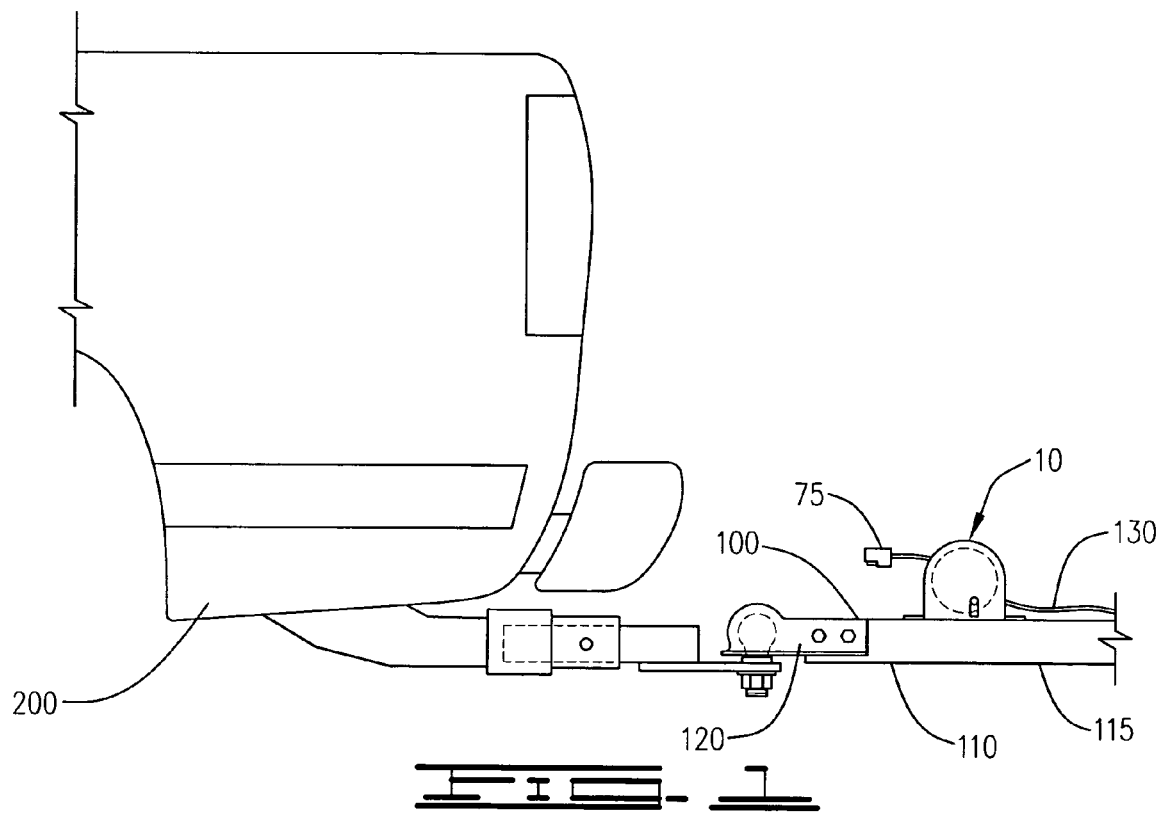
FIG. 1 is a side view of the retractable reel wiring harness device mounted upon the frame arm of a trailer connected to a trailer hitch.

A retractable wiring harness device 10 for a trailer 100 pulled behind a vehicle 200 is attached to a front portion 115 of a trailer frame arm 110 near the trailer hitch 120 of the trailer and to the multiple electrical wires 135 forming the trailer wiring harness 130 of the trailer 100, FIGS. 1-8B of the drawings, the retractable wiring harness device 10 comprising a housing member 20 providing an upper member 22 and a base member 28 defining an inner cavity 29 and having a housing outlet 26, a cylindrical retractable reel 30 having an outer surface 62, an inner surface 64 providing a plurality of recessed parallel conductive tracks 65, and a plurality of spokes 44 connecting the retractable reel 30 to a reel hub 46, the reel hub 46 rotationally suspending the retractable reel 30 within the inner cavity 29 of the housing member 20 by a reel axle 36, a reel retracting means 34, a retractable wiring harness 70 wound around the retractable reel 30 formed from a plurality of electrical wires 71 having a first end 72 attached to the outer surface 62 of the retractable reel 30, each electrical wire of the retractable wiring harness 70 in contact with a respective recessed parallel conductive track 65 on the inner surface 64, the retractable wiring harness 70 having a second end 74 with an electrical plug 75 exiting outside of the housing outlet 26, the electrical plug 75 restricted in size from entry into the inner cavity 29 of the housing member 20, and a wire contact strip 80 having a plurality of wiring harness contacts 91, each of the plurality of contacts 91 respectively connected to one of the plurality of electrical wires 135 of the trailer wiring harness 130, the plurality of wiring harness contacts 91 conductively connected to a plurality of contact pins 93 in respective contact with one of each of the recessed parallel conductive tracks 65 on the inner surface 64 of the retractable reel 30, whereby electrical current may be transmitted from the electrical wires 71 of the retractable wiring harness 70 to the electrical wires 135 of the trailer wiring harness 130 through the retractable wiring harness device 10.

Figure 2:
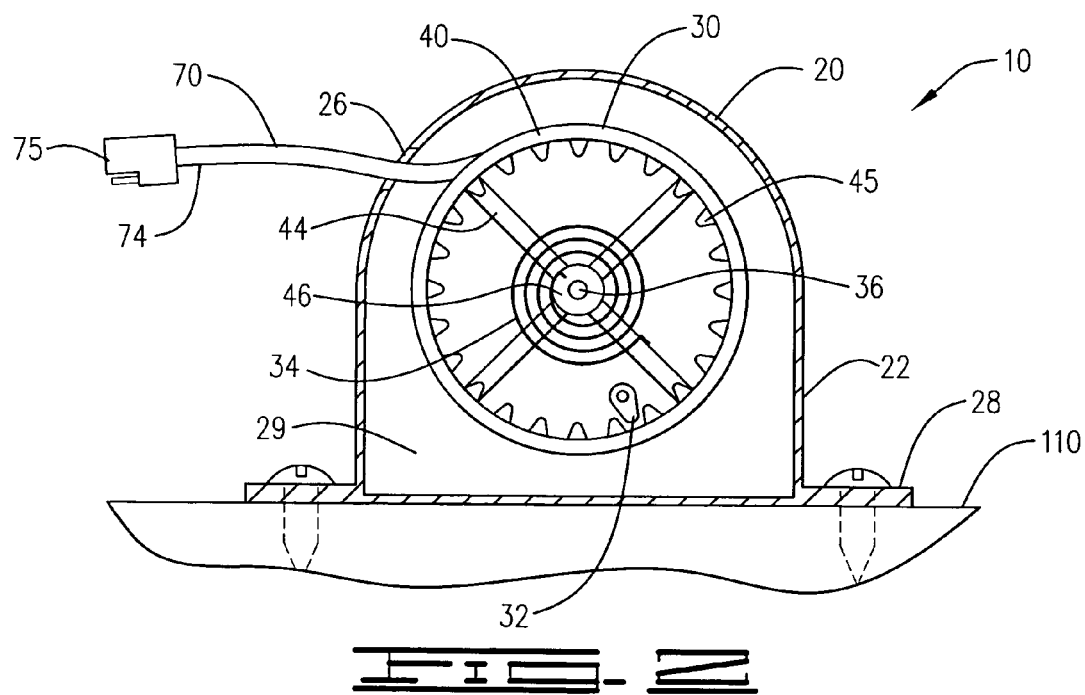
FIG. 2 is a cross sectional side view of the harness device showing the reel within the housing.
Figure 5:
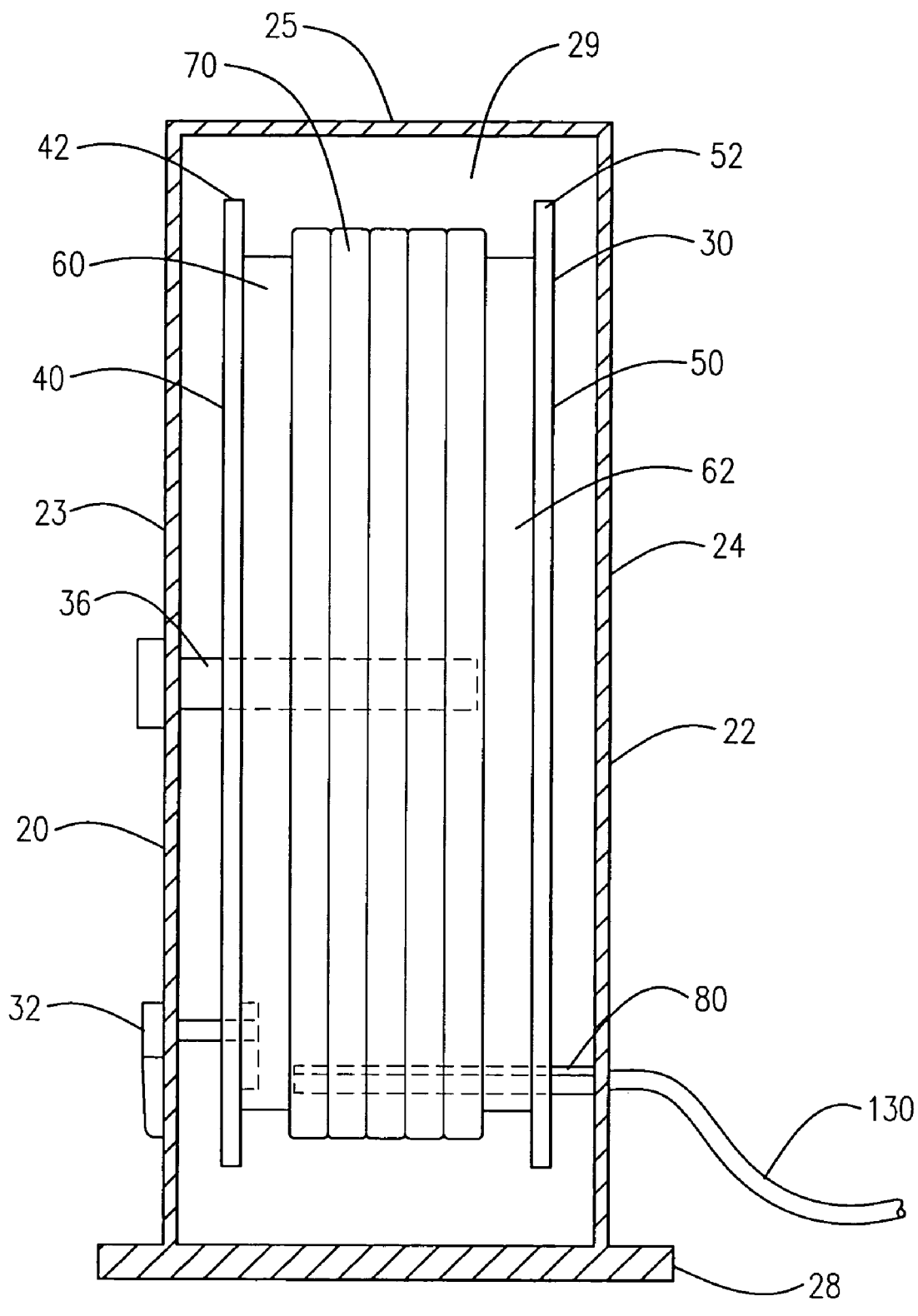
FIG. 5 is a cross sectional rear view of the harness device showing the reel within the housing.
Figure 6:
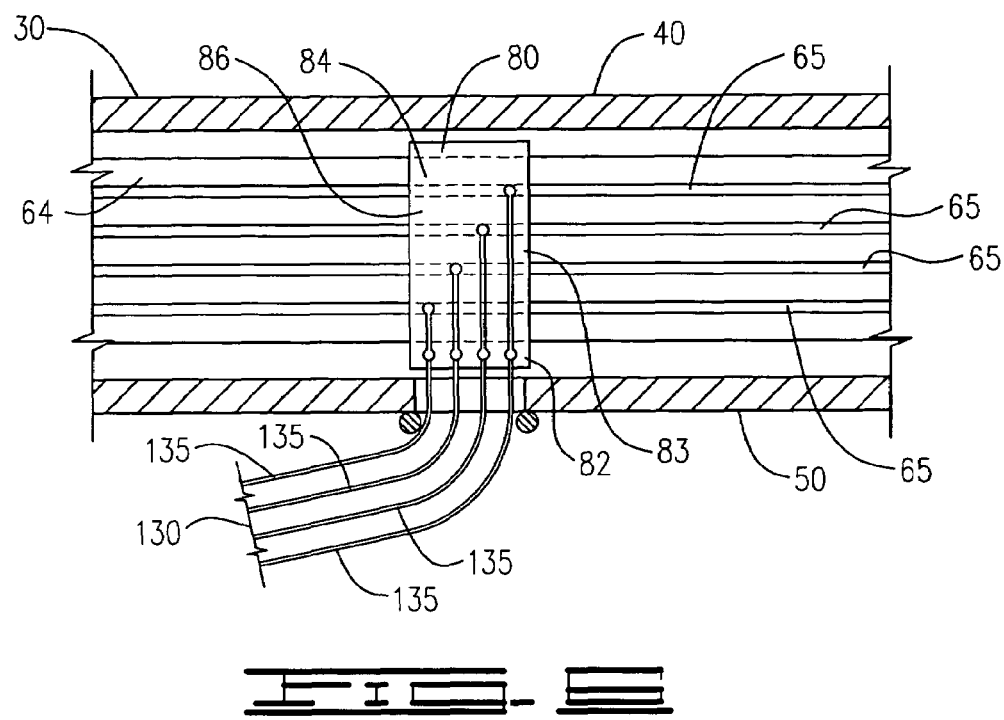
FIG. 6 is an upper cross sectional isolated view of the inner surface of the reel in relation to the wire contact strip.
Figure 7:
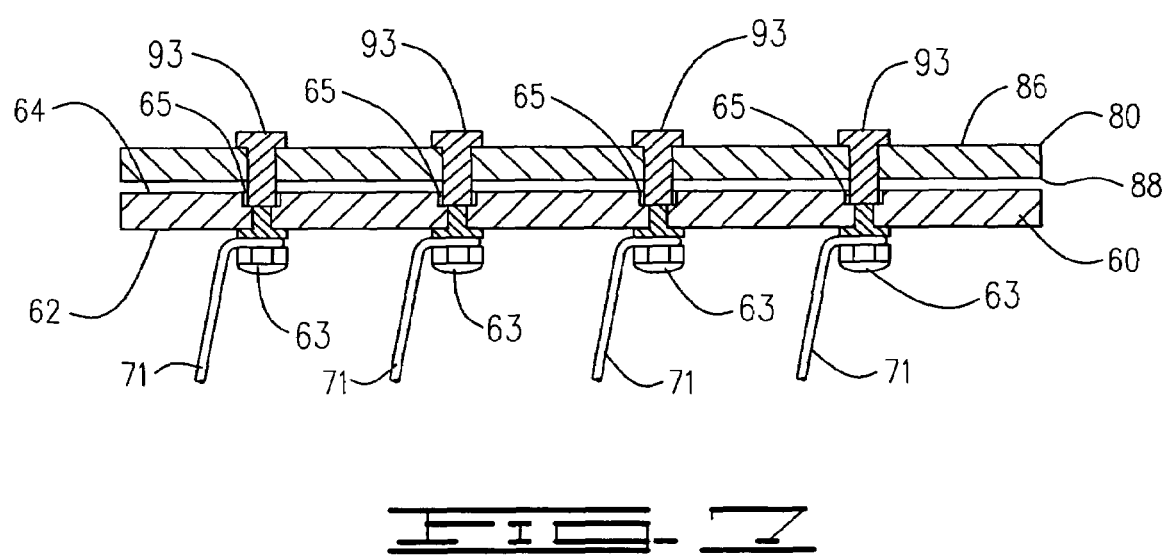
FIG. 7 is a side cross sectional representation of the relationship of the wire strip contact and the reel, indicating the electrical connection between the wire strip contact pins the inner reel recessed tracks and the outer reel terminal pins.
Figure 8A:
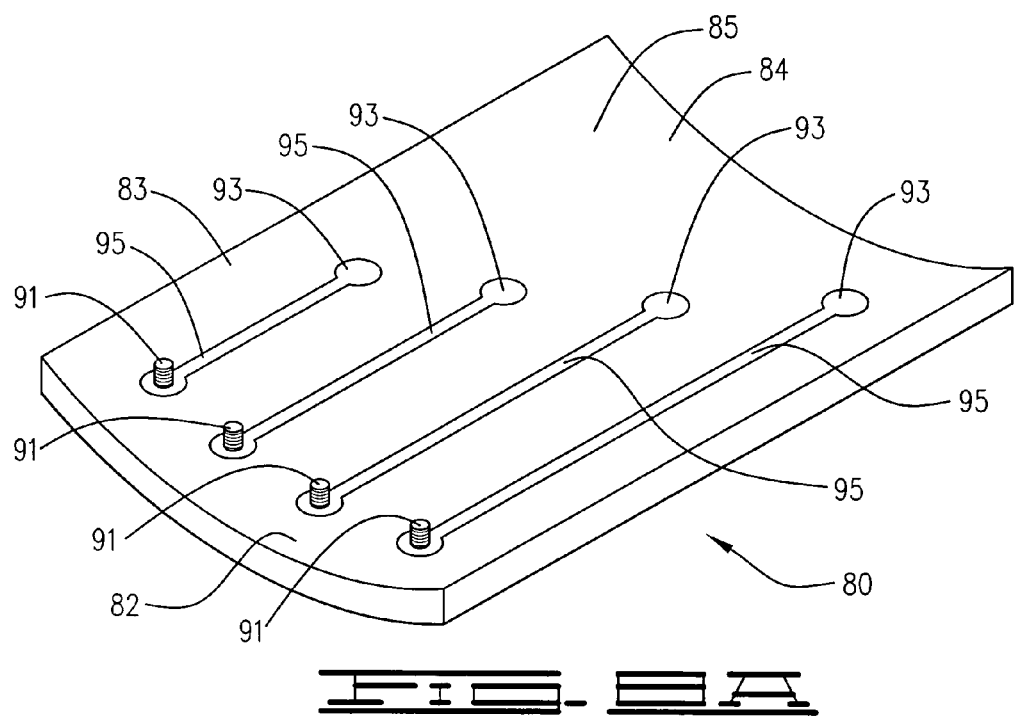
FIG. 8A is an upper perspective view of the wire strip contact.
Figure 8B:
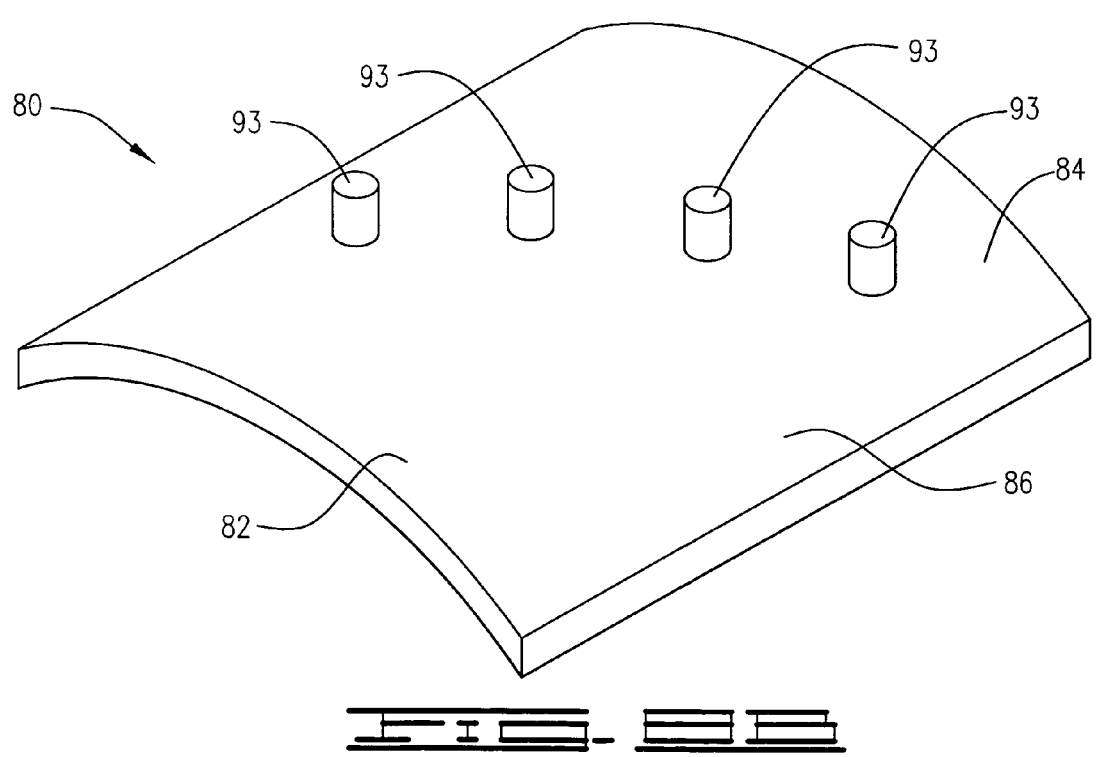
FIG. 8B is a lower perspective view of the wire strip contact.

The retractable wiring harness device 10 further comprises the housing member 20 having the base member 28 and the upper member 22, the upper member 22 comprising a first side segment 23, a second side segment 24 and a peripheral section 25 defining the inner cavity 29, FIGS. 2 and 5, the cylindrical retractable reel 30 having a first side 40 providing a first perimeter rim 42, the plurality of spokes 44 attached between the first perimeter rim 42 and the reel hub 46 with a central projecting reel hub spindle 48, FIG. 4, the reel retracting means 34 urging the retractable reel 30 in a rotational motion, a second side 50 providing a second perimeter rim 52, and a cylindrical reel platform 60 providing the outer surface 62 and the inner surface 64, the inner surface 64 including the plurality of recessed parallel conductive tracks 65, FIGS. 4 and 5, the reel platform 60 further attached between the first and second perimeter rims 42, 52, the reel axle 36 rotatably suspending the retractable reel 30 within the housing member 20 from the first side segment 23, FIG. 5, a reel locking means 32 engaging a plurality of inner reel teeth 45 in the first perimeter rim 42 to intentionally prevent the retractable reel 30 from rotating within the housing member 20, FIGS. 3a and 3B, the retractable wiring harness 70 having the first end 72 attached to a plurality of terminal connectors 63 attached to the outer surface 62 of the reel platform 60, FIG. 7, each of the plurality of terminal connectors 63 in contact with one of the plurality of recessed parallel conductive tracts 65 in the inner surface 64, FIGS. 4 and 7, the retractable wiring harness 70 further providing the second end 74 forming the electrical plug 75, the second end 74 exiting the housing member 20 through the housing outlet 26 in the peripheral section 25, FIG. 2, the electrical plug 75 adapted to be connected to an electrical socket (not shown) in the vehicle 200, and the wire contact strip 80, FIGS. 6-8B, defining a first end 82 having the plurality of harness wiring contacts 91 on an upper surface 86 connecting to each of the plurality of electrical wires 135 forming the trailer wiring harness 130, FIG. 6, the wiring contact strip 80 further defining a body portion 83 and a second end 84 including the plurality of contact pins 93 on a lower surface 88, FIGS. 7 and 8B, each of the wiring harness contacts 91 and each of the contact pins 93 connected by a respective conductive strip 95 on the upper surface 86, FIG. 8A, each contact pin 91 being respectively directed within one of the recessed parallel conductive tracks 65, FIG. 7, providing a constant contact between the contact pins 93 and the recessed parallel conductive tracks 65, thereby completing an electrical circuit between the trailer wiring harness 130 and the electrical plug 75 at all times during the rotation of the cylindrical retractable reel 30 within the housing member 20.

The number of electrical wires 71, 135 in the trailer wiring harness 130 and the retractable wiring harness 70 should be equal in number, most preferably four wires, six wires or a number which is appropriate for the trailer lights and other electrical equipment to properly function and also to adapt to the electrical socket in the towing vehicle. Likewise, the electrical plug 75 attached to the second end 74 of the retractable wiring harness 70 must adapt to the electrical socket in the towing vehicle. The number of recessed parallel conductive tracks 65, contacts 91, terminal connectors 63 and pins 93 would also be equal to the number of wires included in the trailer wiring harness and the retractable wiring harness to provide a complete individual electrical circuit for each wire from the electrical plug to the trailer lights and electrical equipment.

One embodiment of the reel retracting means 34, shown in FIG. 2 of the drawings, is a coil spring which may be applied between any segment of the retractable reel 30 and a stationary component of the housing member 20 or reel axle 36, provided the attachment would cause the retractable reel 30 to wind the retractable wiring harness 70 around the outer surface 62 of the cylindrical reel platform 60.

The wire contact strip 80 may have a slight curvature, as indicated in FIGS. 7-8B, such curvature conforming to the curvature of the inner surface 64 of the cylindrical reel platform 60 of the retractable reel 30 to maintain a consistent contact between the plurality of contact pins 93 and the plurality of recessed parallel conductive tracks 65. In addition, the contact pins 93 should be resilient or flexible to provide continuous contact in the event of jarring or vibration during movement of the vehicle 200 and trailer 100.

The base member 28 may be attached to the trailer arm 110 by any means suitable, including using screws, as indicated in FIG. 2, but may also be attached by bolts, rivets, adhesive or other means depending on the material from which the housing member 20 is made, which may be plastic or metal. The trailer wiring harness 70 is shown in FIGS. 5 and 6 going into the housing member 20 on the second side segment 24. However, the trailer wiring harness 130 may be inserted through the housing member 20 along the peripheral section 25, although not shown in the drawing figures. The wiring contact strip 80 may be changed in shape from that depicted in the drawings to accommodate such relocation of the trailer wiring harness 130 entry into the housing member 20, provided the basic relationship between the pins 93 and the recessed parallel conductive tracks 65 on the inner surface 64 of the retractable reel 30 is not altered.

While the retractable wire harness device 10 has been particularly shown and described with reference to a preferred embodiment thereof, it will be understood by those skilled in the art that changes in form and detail may be made therein without departing from the spirit and scope of the invention.

The invention claimed is:

1. A retractable wiring harness device for a trailer pulled behind a vehicle is attached to a front portion of a trailer frame arm near a trailer hitch of the trailer and to multiple electrical wires forming a trailer wiring harness of the trailer, said retractable wiring harness device comprising:
   a housing member providing an upper member and a base member defining an inner cavity and having a housing outlet;
   a cylindrical retractable reel having an outer surface, an inner surface providing a plurality of recessed parallel conductive tracks, and a plurality of spokes connecting said retractable reel to a reel hub, said reel hub rotationally suspending said retractable reel within said inner cavity of said housing member by a reel axle;
   a reel retracting means urging said retractable reel to rotate in a circular manner within said housing member about said reel axle;
   a retractable wiring harness wound around said retractable reel formed from a plurality of electrical wires having a first end attached to said outer surface of said retractable reel, each electrical wire said retractable wiring harness in contact with a respective recessed parallel conductive track on said inner surface, said retractable wiring harness having a second end with an electrical plug which is maintained outside of said housing member; and
   a wire contact strip having a plurality of wiring harness contacts, each of said plurality of contacts respectively connected to one of said plurality of electrical wires of said trailer wiring harness, said plurality of wiring harness contacts conductively connected to a plurality of contact pins in respective contact with one of each of said recessed parallel conductive tracks on said inner surface of said retractable reel, whereby electrical current may be transmitted from said retractable wiring harness to said wiring harness.

2. The retractable wiring harness device, as disclosed in claim 1, further comprising:
   said housing member having said base member and said upper member, said upper member comprising a first side segment, a second side segment and a peripheral section defining said inner cavity, with said housing outlet in said peripheral section.

3. The retractable wiring harness device, as disclosed in claim 1, further comprising:
   said housing member having said base member and said upper member, said upper member comprising a first side segment, a second side segment and a peripheral section defining said inner cavity, with said housing outlet in said peripheral section;
   said cylindrical retractable reel having a first side providing a first perimeter rim, said plurality of spokes attached between said first perimeter rim and said reel hub with a central projecting reel hub spindle, said reel retracting means urging said retractable reel in a rotational motion, a second side providing a second perimeter rim, and a cylindrical reel platform providing said outer surface and said inner surface, said inner surface including said plurality of recessed parallel conductive tracks, said reel platform further attached between said first and second perimeter rims, said reel axle rotatably suspending said retractable reel within said housing member from said first side segment; and
   a reel locking means engaging a plurality of inner reel teeth in said first perimeter rim to intentionally prevent said retractable reel from rotating within said housing member.

4. The retractable wiring harness device, as disclosed in claim 1, further comprising:
   said housing member having said base member and said upper member, said upper member comprising a first side segment, a second side segment and a peripheral section defining said inner cavity, with said housing outlet in said peripheral section;
   said cylindrical retractable reel having a first side providing a first perimeter rim, said plurality of spokes attached between said first perimeter rim and said reel hub with a central projecting reel hub spindle, said reel retracting means urging said retractable reel in a rotational motion, a second side providing a second perimeter rim, and a cylindrical reel platform providing said outer surface and said inner surface, said inner surface including said plurality of recessed parallel conductive tracks, said reel platform further attached between said first and second perimeter rims, said reel axle rotatably suspending said retractable reel within said housing member from said first side segment;
   a reel locking means engaging a plurality of inner reel teeth in said first perimeter rim to intentionally prevent said retractable reel from rotating within said housing member; and
   said retractable wiring harness having said first end attached to a plurality of terminal connectors attached to said outer surface of said reel platform, each of said plurality of terminal connectors in contact with one of said plurality of recessed parallel conductive tracts in said inner surface, said retractable wiring harness further providing said second end forming said electrical plug, said second end exiting said housing member through said housing outlet in said peripheral section.

5. The retractable wiring harness device, as disclosed in claim 1, further comprising:
   said housing member having said base member and said upper member, said upper member comprising a first side segment, a second side segment and a peripheral section defining said inner cavity, with said housing outlet in said peripheral section;
   said cylindrical retractable reel having a first side providing a first perimeter rim, said plurality of spokes attached between said first perimeter rim and said reel hub with a central projecting reel hub spindle, said reel retracting means urging said retractable reel in a rotational motion, a second side providing a second perimeter rim, and a cylindrical reel platform providing said outer surface and said inner surface, said inner surface including said plurality of recessed parallel conductive tracks, said reel platform further attached between said first and second perimeter rims, said reel axle rotatably suspending said retractable reel within said housing member from said first side segment;
   a reel locking means engaging a plurality of inner reel teeth in said first perimeter rim to intentionally prevent said retractable reel from rotating within said housing member;

said retractable wiring harness having said first end attached to a plurality of terminal connectors attached to said outer surface of said reel platform, each of said plurality of terminal connectors in contact with one of said plurality of recessed parallel conductive tracts in said inner surface, said retractable wiring harness further providing said second end forming said electrical plug, said second end exiting said housing member through said housing outlet in said peripheral section; and said wiring contact strip further defining a body portion and a second end including said plurality of contact pins on a lower surface, each of said wiring harness contacts and each of said contact pins connected by a respective conductive strip on said upper surface, each contact pin being respectively directed within one of said recessed parallel conductive tracks, providing a constant contact between said contact pins and said recessed parallel conductive tracks, thereby completing an electrical circuit between said trailer wiring harness and said electrical plug at all times during rotation of said retractable reel within said housing member.

* * * * *